US009558776B1

(12) United States Patent
Biskeborn et al.

(10) Patent No.: US 9,558,776 B1
(45) Date of Patent: Jan. 31, 2017

(54) DURABLE COATING FOR MAGNETIC TAPE RECORDING MEDIA

(71) Applicant: International Business Machines Corporation, Armonk, NY (US)

(72) Inventors: Robert G. Biskeborn, Hollister, CA (US); Gary M. Decad, Palo Alto, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/967,073

(22) Filed: Dec. 11, 2015

(51) Int. Cl.
G11B 5/72 (2006.01)
G11B 5/65 (2006.01)
G11B 5/725 (2006.01)

(52) U.S. Cl.
CPC ............ *G11B 5/656* (2013.01); *G11B 5/653* (2013.01); *G11B 5/722* (2013.01); *G11B 5/725* (2013.01)

(58) Field of Classification Search
None
See application file for complete search history.

(56) References Cited

U.S. PATENT DOCUMENTS

| 4,743,502 A * | 5/1988 | Yoshitomi | G11B 5/72 428/336 |
| 5,236,791 A * | 8/1993 | Yahisa | G11B 5/72 428/611 |
| 5,441,800 A | 8/1995 | Utsumi | |
| 5,900,318 A * | 5/1999 | Yanagisawa | G11B 5/725 428/422 |
| 6,641,932 B1 * | 11/2003 | Xu | G11B 5/66 428/336 |
| 6,811,890 B1 * | 11/2004 | Zhou | G11B 5/66 428/336 |
| 6,875,492 B1 * | 4/2005 | Pirzada | G11B 5/72 428/216 |
| 8,110,298 B1 * | 2/2012 | Choe | G11B 5/65 428/827 |
| 2004/0166375 A1 | 8/2004 | Nagai | |
| 2004/0258873 A1 * | 12/2004 | Usuki | G11B 5/64 428/848.2 |
| 2007/0227624 A1 * | 10/2007 | Hattori | G11B 5/714 148/105 |
| 2007/0231610 A1 * | 10/2007 | Waki | G11B 5/714 428/836.3 |
| 2010/0279105 A1 | 11/2010 | Pyun et al. | |
| 2011/0236722 A1 | 9/2011 | Mandai et al. | |
| 2014/0342189 A1 | 11/2014 | Tachibana et al. | |

FOREIGN PATENT DOCUMENTS

WO        9903944 A1    1/1999

OTHER PUBLICATIONS

Sekiguchi et al., "The Development of Perpendicular Magnetic Recording Tape by Roll-to-Roll In-Line Sputtering," IEEE Transactions on Magnetics, vol. 50, No. 11, Nov. 2014, 4 pages.

* cited by examiner

*Primary Examiner* — Kevin Bernatz
(74) *Attorney, Agent, or Firm* — Zilka-Kotab, PC

(57) ABSTRACT

A product such as a magnetic recording tape, according to one embodiment, includes a flexible magnetic media having a substrate, a magnetic recording layer having cobalt therein, and an at least partially polycrystalline coating above the magnetic recording layer. A product according to another embodiment includes a flexible magnetic media having a substrate, a magnetic recording layer having cobalt therein, and coating above the magnetic recording layer. The coating includes a ceramic material.

20 Claims, 10 Drawing Sheets

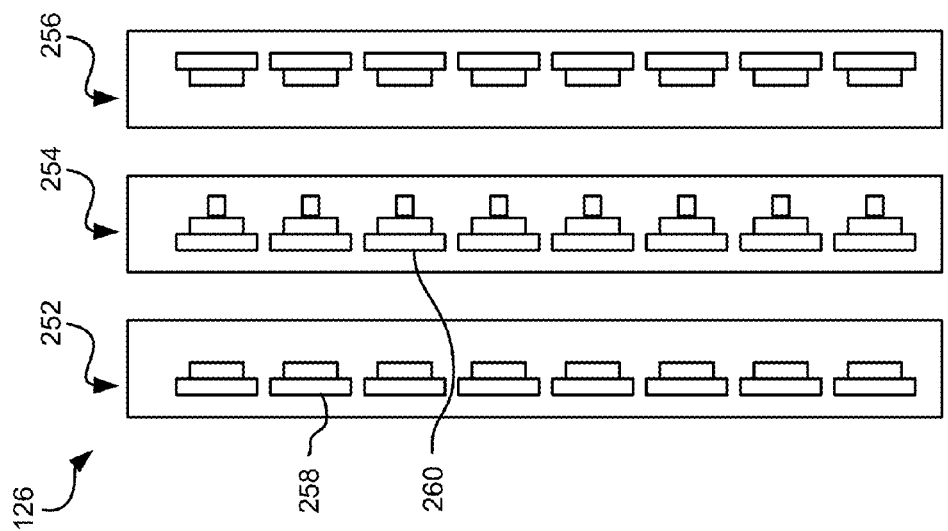
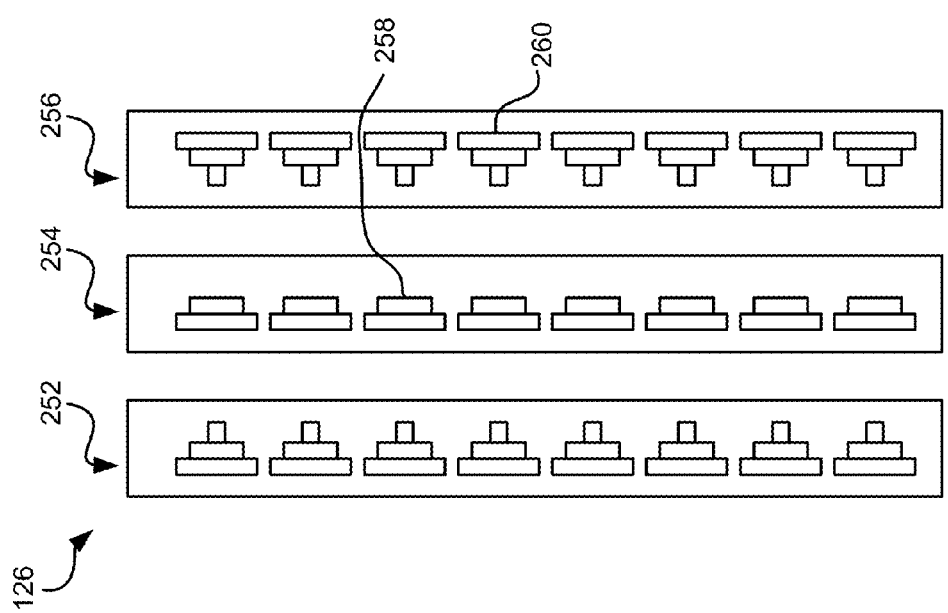

DURABLE COATING FOR MAGNETIC TAPE RECORDING MEDIA

BACKGROUND

The present invention relates to data storage systems, and more particularly, this invention relates to recording media for use with data storage systems.

In magnetic storage systems, magnetic transducers read data from and write data onto magnetic recording media. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, the drive moves the magnetic tape over the surface of the tape head at high speed. Usually the tape head is designed to minimize the spacing between the head and the tape. The spacing between the magnetic head and the magnetic tape is crucial and so goals in these systems are to have the recording gaps of the transducers, which are the source of the magnetic recording flux in near contact with the tape to effect writing sharp transitions, and to have the read elements in near contact with the tape to provide effective coupling of the magnetic field from the tape to the read elements.

BRIEF SUMMARY

A product according to one embodiment includes a flexible magnetic media having a substrate, a magnetic recording layer having cobalt therein, and an at least partially polycrystalline coating above the magnetic recording layer.

A product according to another embodiment includes a flexible magnetic media having a substrate, a magnetic recording layer having cobalt therein, and coating above the magnetic recording layer. The coating includes a ceramic material.

Any of these embodiments may be used with a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, a product includes a flexible magnetic media having a substrate, a magnetic recording layer having cobalt therein, and an at least partially polycrystalline coating above the magnetic recording layer.

In another general embodiment, a product includes a flexible magnetic media having a substrate, a magnetic recording layer having cobalt therein, and coating above the magnetic recording layer. The coating includes a ceramic material.

Figure 1A:
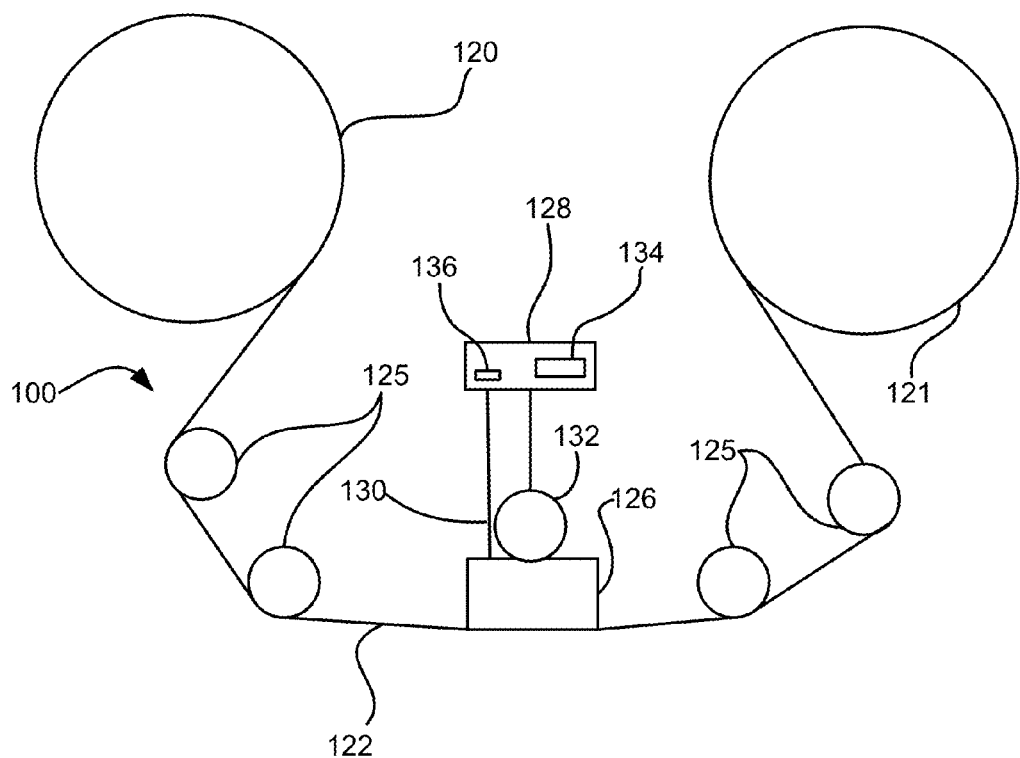
FIG. 1A is a schematic diagram of a simplified tape drive system according to one embodiment.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 1B:
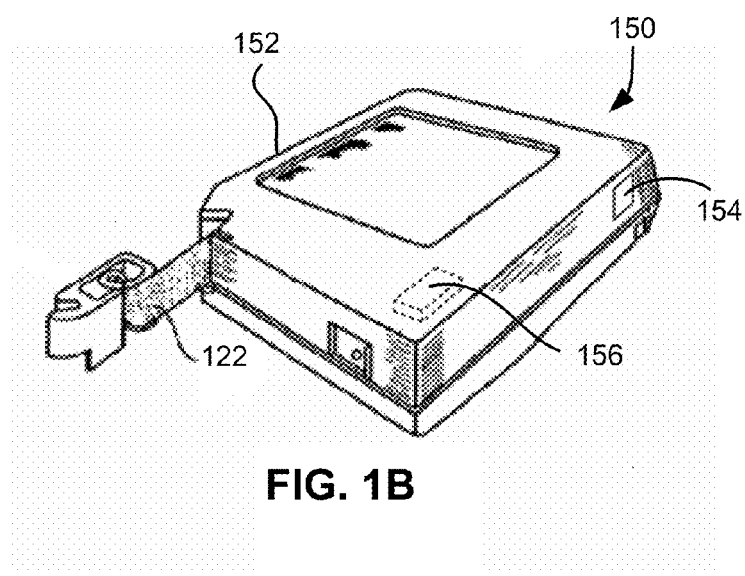
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
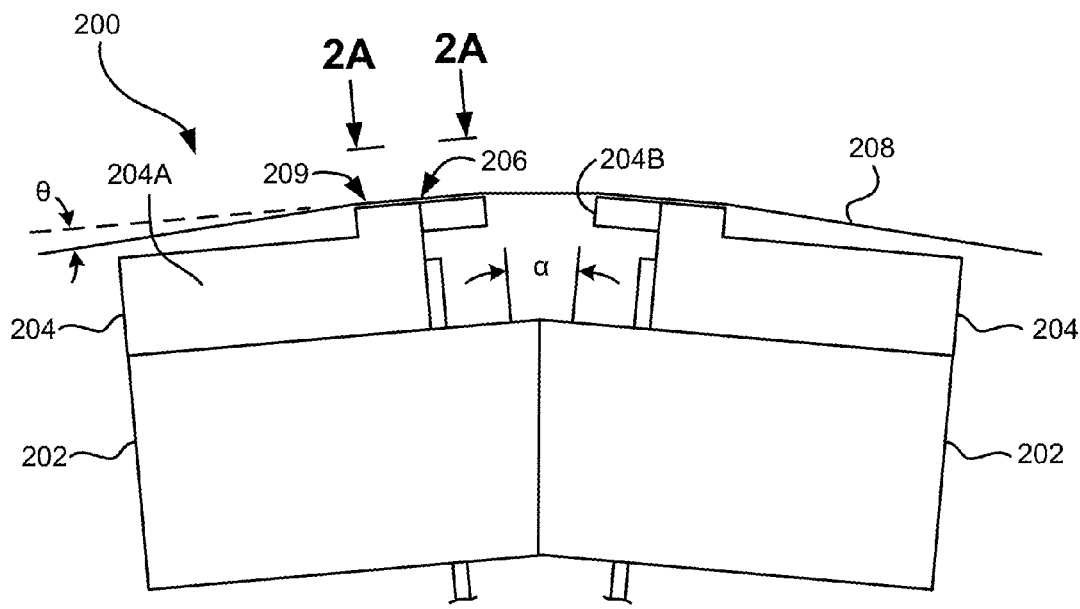
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 3 degrees.

The substrates 204A are typically constructed of a wear resistant material, such as a ceramic. The closures 204B may be made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
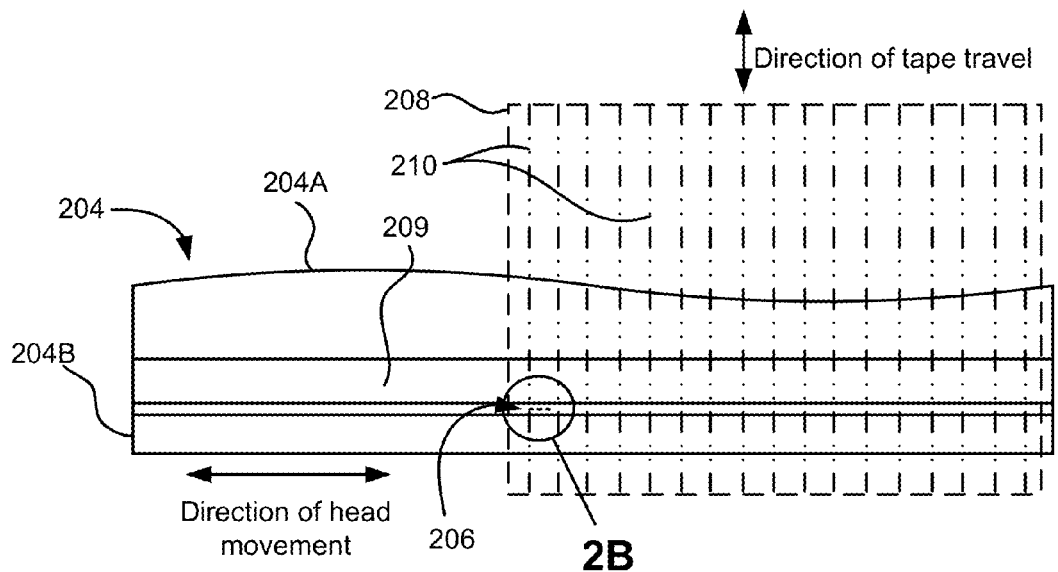
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 32 data bands, e.g., with 16 data bands and 17 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
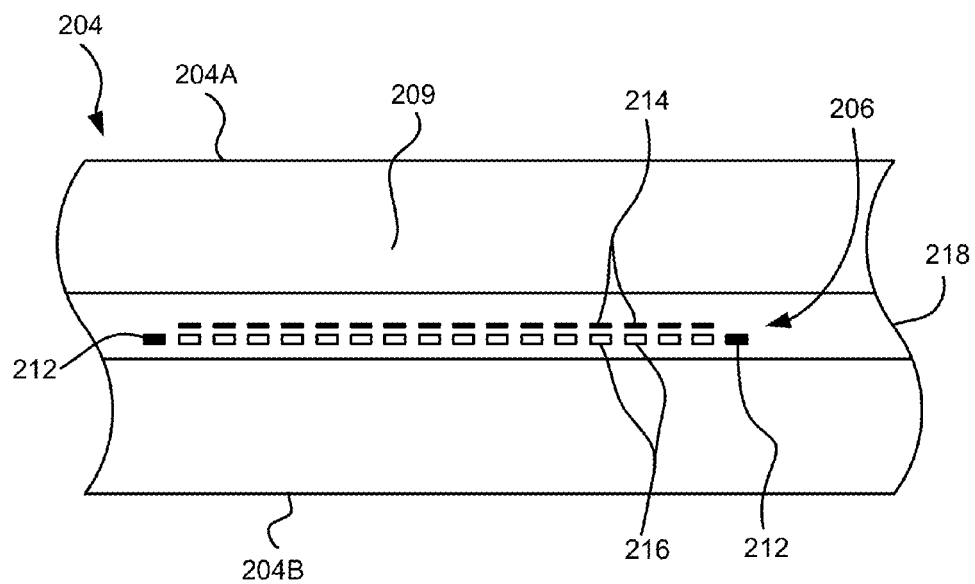
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
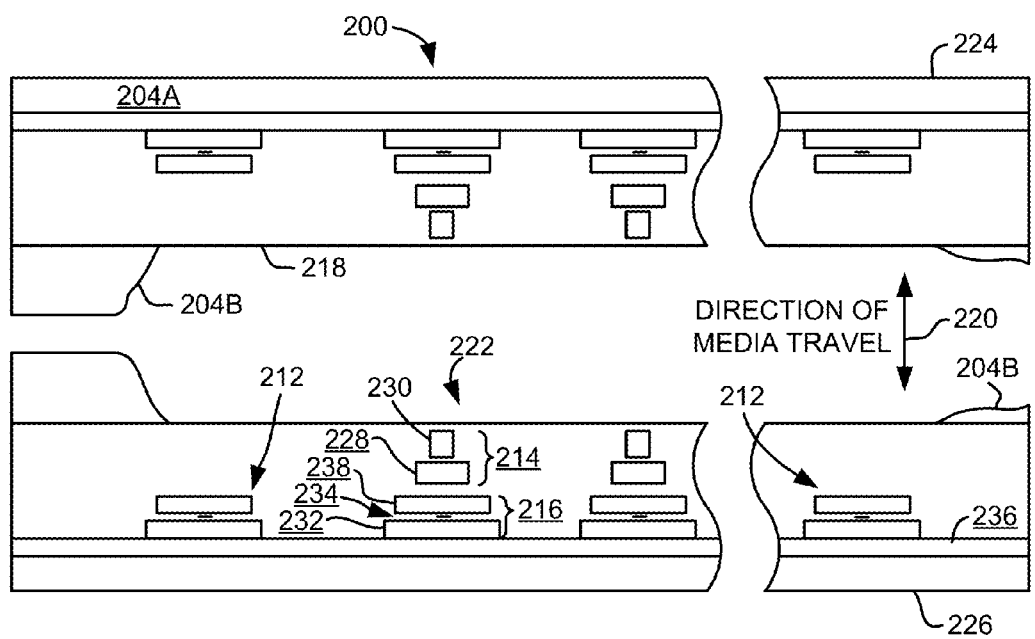
FIG. 2C is a detailed view of a partial tape bearing surface of a pair of modules.

FIG. 2C shows a partial tape bearing surface view of complementary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write transducer 214 and the readers, exemplified by the read transducer 216, are aligned parallel to an intended direction of travel of a tape medium thereacross to form an R/W pair, exemplified by the R/W pair 222. Note that the intended direction of tape travel is sometimes referred to herein as the direction of tape travel, and such terms may be used interchangeably. Such direction of tape travel may be inferred from the design of the system, e.g., by examining the guides; observing the actual direction of tape travel relative to the reference point; etc. Moreover, in a system operable for bi-direction reading and/or writing, the direction of tape travel in both directions is typically parallel and thus both directions may be considered equivalent to each other.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (–), cobalt zirconium tantalum (CZT) or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading.

Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
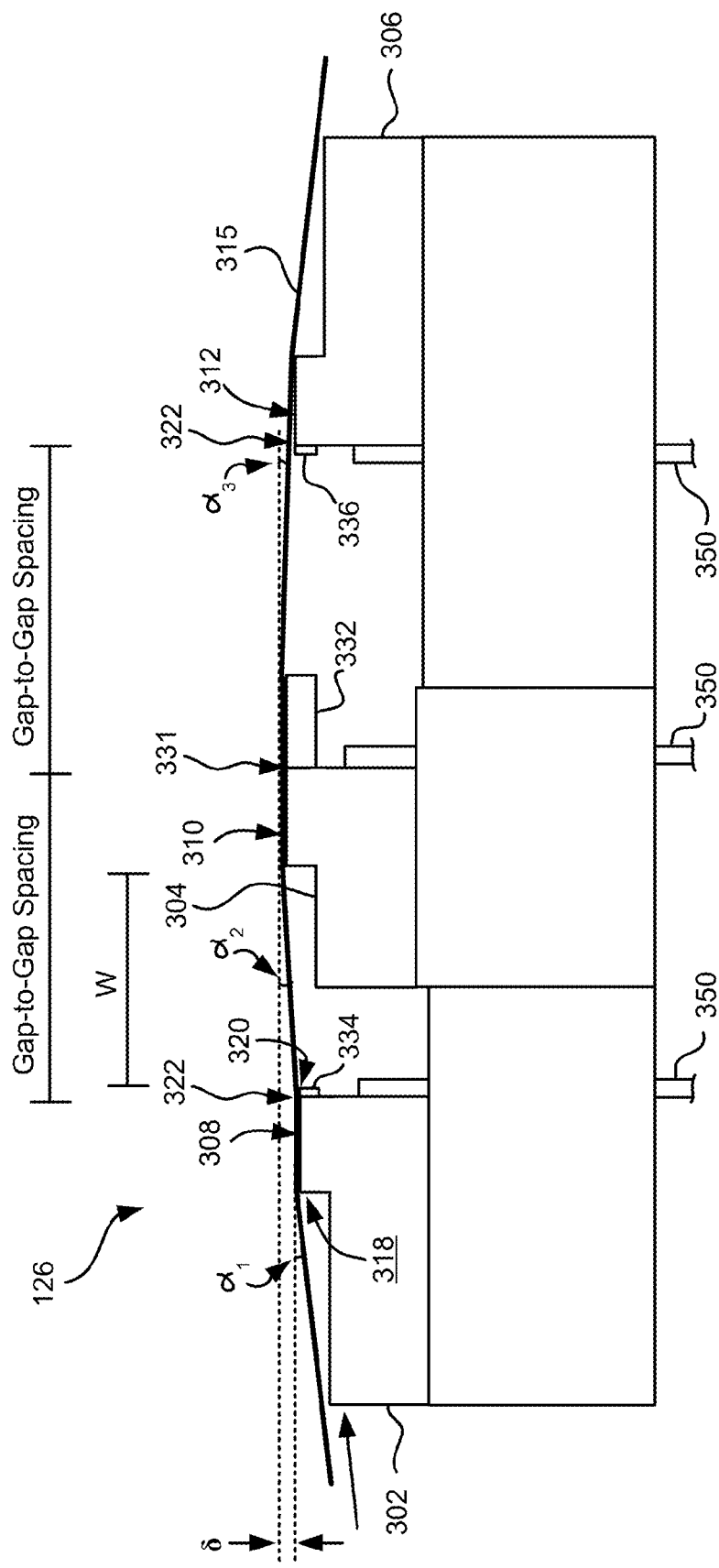
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
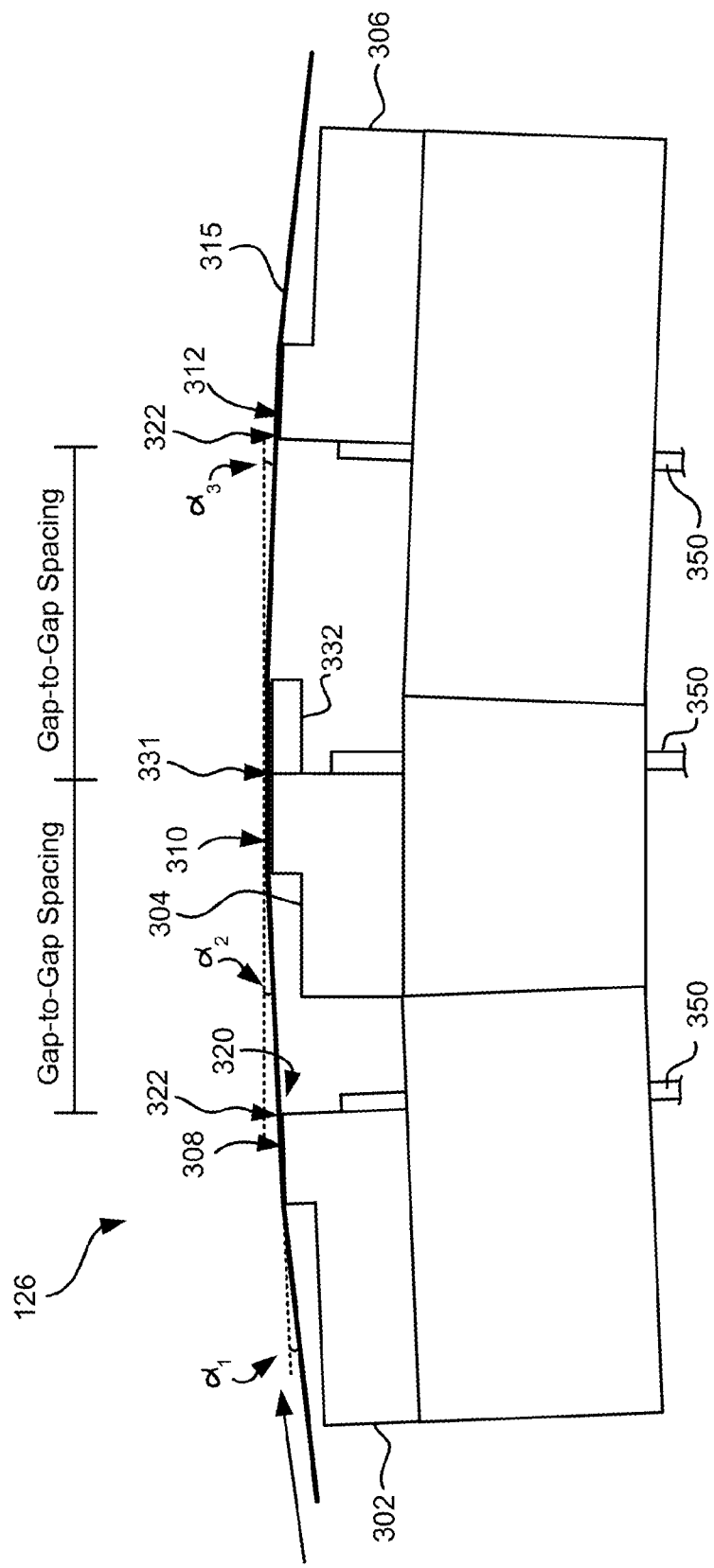
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.3° to about 1.1°, though can be any angle required by the design.

Beneficially, the inner wrap angle $\alpha_2$ on the side of the module 304 receiving the tape (leading edge) will be larger than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no data readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 20-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than commonly-used LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
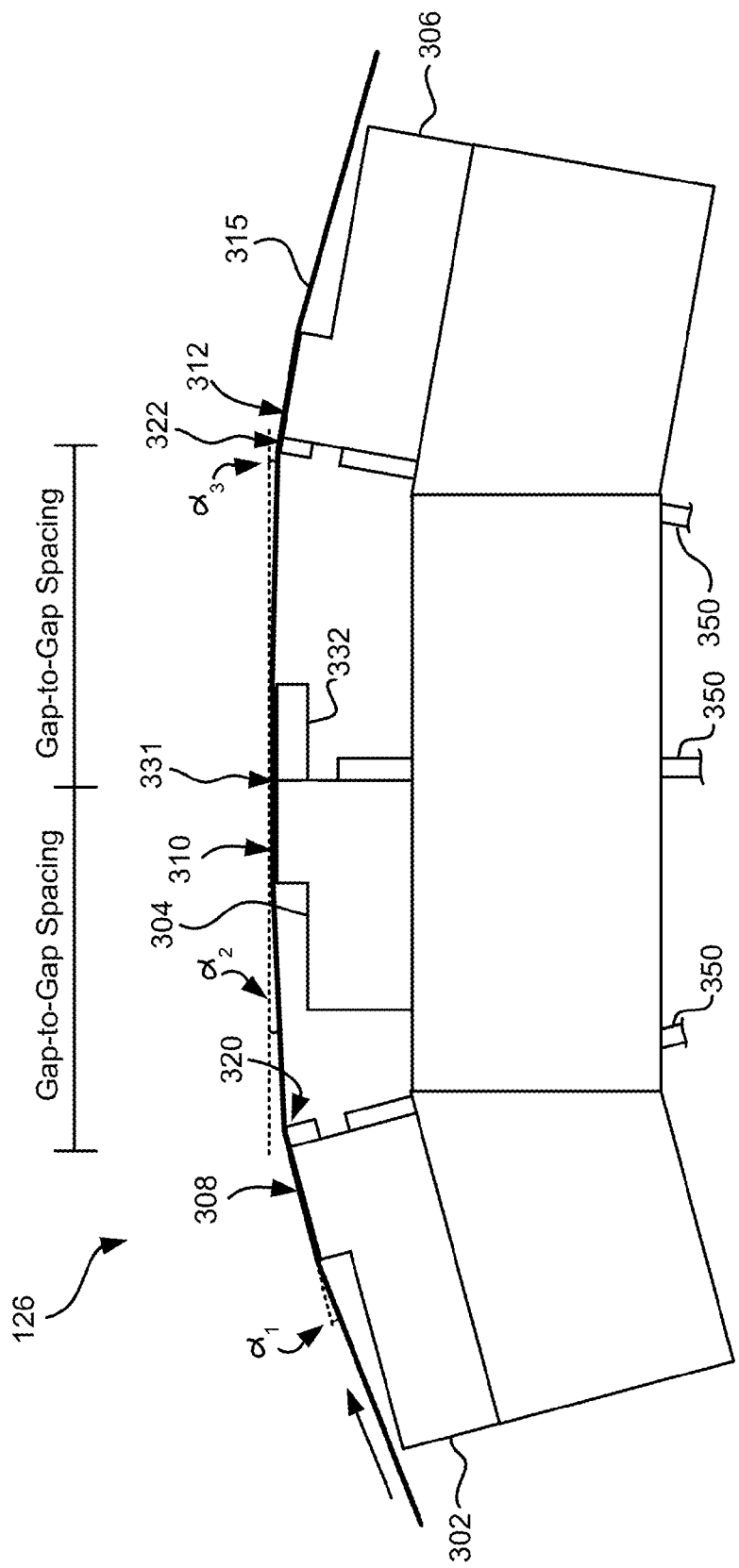
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures may require a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same or smaller pitch as current 16 channel piggyback LTO modules, or alternatively the connections on the module may be organ-keyboarded for a 50% reduction in cable span. Over-under, writing pair unshielded cables may be used for the writers, which may have integrated servo readers.

The outer wrap angles $\alpha_1$ may be set in the drive, such as by guides of any type known in the art, such as adjustable rollers, slides, etc. or alternatively by outriggers, which are integral to the head. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head may be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads. Moreover, unless otherwise specified, processes and materials of types known in the art may be adapted for use in various embodiments in conformance with the teachings herein, as would become apparent to one skilled in the art upon reading the present disclosure.

With continued reference to tape drive systems, when tape is passed over the head and sensors, particulates and asperities in or on the media, e.g., trapped in surface defects in conventional BaFe media, may cause shorting of current perpendicular to plane sensors, especially tunnel junction sensors, e.g., due to the particulates and asperities smearing and/or dragging conductive material across the tunnel barrier layer. Particularly, the defects and asperities can deform metallic portions of the sensor, such as the permalloy shields and/or CoFe(B) pinned and free layers (which are also current carrying layers), resulting in the formation of metallic bridges across the tunnel junction, which is very thin in modern TMR heads, e.g. less than approximately 2 nm, and thereby cause a short across the tunnel barrier layer. This shorting may degrade the magnetic recording drive reading performance. For example, shorting may reduce signal levels and disrupt channel performance, resulting in degraded signal to noise ratio (SNR), etc.

Attempts have been made to alleviate shorting issues by recessing the sensor and/or coating the heads of tape drive systems. Recessing the sensor has proven to be only partially effective, and coating the head may not last the entire life of the drive.

In hard disk drives, both disk and heads are coated with diamond-like carbon (DLC), and fluorine based lubricant is applied to the disks. However, this coating is primarily for corrosion protection, and furthermore disk heads do not run in continuous contact with the media. Conversely, in tape systems, heads and media are in frequent contact. Furthermore, many current particulate tape products are not coated because the media contains waxy materials which serve as lubricants which are likely to prevent coatings from adhering properly.

In sharp contrast to the aforementioned shortcomings, embodiments described herein include a coated media that avoids the aforementioned shorting issues.

Figure 8:
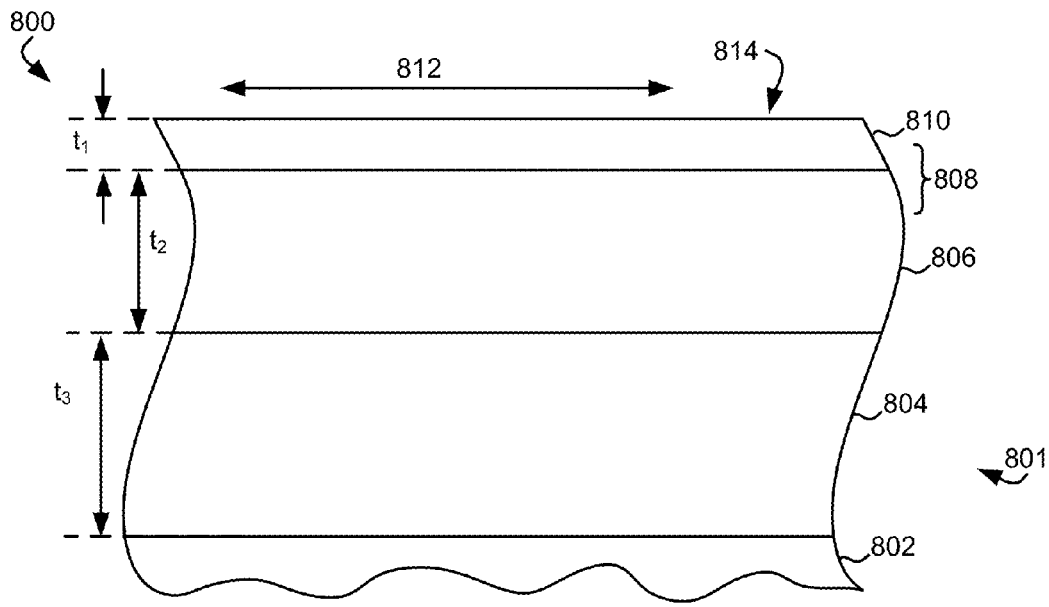
FIG. 8 is a partial cross-sectional view of a coated flexible magnetic media, in accordance with one embodiment.

FIG. 8 depicts a product 800 in accordance with one embodiment. As an option, the present product 800 may be implemented in conjunction with features from any other embodiment listed herein, such as those described with reference to the other FIGS. Of course, however, such product 800 and others presented herein may be used in various applications and/or in permutations which may or may not be specifically described in the illustrative embodiments listed herein. Further, the product 800 presented herein may be used in any desired environment.

Product 800 includes a flexible magnetic media 801, e.g., a magnetic tape. The flexible magnetic media 801 includes a substrate 802 and an underlayer 804. The substrate 802 and underlayer 804 may be of a type known in the art. Moreover, by depositing layers of material onto the substrate 802, as described herein, a flexible magnetic coated media may be created.

It should be noted that the inclusion of the underlayer in product 800 is optional and accordingly may be omitted in other embodiments. The underlayer 804 may include iron, nickel, aluminum, etc. According to other embodiments the underlayer 804 may include alpha hematite, cobalt, etc., and/or other underlayer materials of types known in the art. The underlayer 804 may have a thickness $t_3$ of about 0.1 to 2 microns, but may be higher or lower depending on the preferred embodiment.

The flexible magnetic media 801 includes a magnetic recording layer 806. The magnetic recording layer 806 may include a ferromagnetic material such as iron, nickel, and/or cobalt. The magnetic recording layer 806 may further include at least one material selected from the group including: platinum, chromium, aluminum, nickel, etc.

In preferred embodiments, the magnetic recording layer 806 includes cobalt. For example, according to one exemplary embodiment, the magnetic recording layer 806 may include an alloy of cobalt, e.g., CoPtCr.

According to some embodiments, the magnetic recording layer 806 may include magnetic particulates in a binder. In one example, the magnetic recording layer 806 may include a binding material (e.g., a polymer) containing magnetic particles which include clusters of CoFe particles and/or Barium Ferrite crystalline particles.

The flexible magnetic media 801 also includes an at least partially polycrystalline coating 810 above the magnetic recording layer 806. The at least partially polycrystalline coating 810 preferably includes a metal oxide such as aluminum oxide, chromium oxide, ruthenium oxide, etc., and combinations thereof. In another approach, the at least partially polycrystalline coating 810 preferably includes silicon dioxide. The at least partially polycrystalline coating 810 is dielectric in some embodiments, while in others it may be a semiconductor or electrically conductive.

It should be noted that "at least partially polycrystalline layer" as used herein may refer to a primarily crystalline layer, as well as an entirely crystalline layer, where the crystal grains are not all aligned in a crystalline lattice, e.g., crystalline grains are randomly oriented. "At least partially polycrystalline" as used herein may refer to a material in which crystalline grains are mixed with amorphous portions of the material, such that the density increase due to crystallinity is at least 30% greater than the purely amorphous material of the same chemical composition and approximate thickness.

In another embodiment, the coating 810 comprises a ceramic material. The ceramic material may include an amorphous dielectric material. In some embodiments, the ceramic material includes a metallic amorphous material such as a metal oxide, e.g., aluminum oxide, ruthenium oxide, titanium oxide, and chromium oxide. In another approach, the ceramic material may include a nitride such as a metal nitride, e.g., nitrides of boron, silicon, titanium, aluminum, zirconium, etc. In a further approach, the ceramic material includes a dielectric metal oxide. The ceramic material may be amorphous, crystalline, at least partially polycrystalline, etc.

In some embodiments, the coating 810 may comprise multiple solid layers, e.g., 2, 3, 4 or more layers. For example, the coating 810 may include multiple layers of at least partially polycrystalline material, multiple layers of an amorphous material, at least one layer of an at least partially polycrystalline material and at least one layer of an amorphous material, etc.

Referring still to FIG. 8, the coating 810 may preferably have a thickness $t_1$ that is at least three nanometers thick, e.g., where thickness is measured in a direction that is substantially perpendicular to an intended direction of tape travel 812 and the plane of the media. The particular thickness $t_1$ of the coating 810 may selected to provide a desired characteristic, depending on the embodiment, e.g., to promote crystallinity in the coating 810, to maintain preferred magnetic spacing dimensions in product 800, etc., or other reasons that would be appreciated by one skilled in the art upon reading the present description.

The inventors surprisingly and unexpectedly found that having a sufficiently high concentration of cobalt relative to iron in the magnetic recording layer 806 provides a greater level of crystallinity in the coating 810, especially when the coating is formed after the preparatory process described below. This is so, even when the coating 810 is formed near room temperature, which was also not expected. According to various embodiments, the magnetic component of the magnetic recording layer 806 may be at least 10 atomic %, preferably between about 30 atomic % and about 80 atomic % cobalt, with the remainder being iron and optionally other metals mentioned above. Again, the inventors surprisingly and unexpectedly found that high quality crystalline alumina can be grown on a magnetic recording layer at room temperature. This is important, as the high temperatures typically required to form crystalline alumina using prior methods would severely damage the magnetic recording tape.

A thickness $t_2$ of the magnetic recording layer 806 may preferably be at least two nanometers thick, e.g., where thickness is measured in a direction that is substantially perpendicular to the intended direction of tape travel 812. However, the thickness $t_2$ of the magnetic recording layer 806 may be lower than this range, depending on the embodiment.

According to some embodiments, the magnetic recording layer 806 may have physical characteristics of formation by sputtering. Such characteristics would be apparent to one skilled in the art, and will be described in further detail below. Alternatively or additionally, according to some embodiments, the magnetic recording layer 806 may have physical characteristics of formation by vapor deposition. Such characteristics would also be apparent to one skilled in the art.

As discussed in more detail below, a transition region 808 may be present between the magnetic recording layer 806 and the coating 810.

A lubricant (not shown) may be added on the flexible magnetic media 801, e.g., to a partial or entire magnetic head facing surface 814 of the flexible magnetic media 801. Such lubricant may promote smooth, e.g., low friction tape travel over the head (see tape 122 travel across the tape head 126 in FIG. 1A), thereby further reducing the probability of asperities plowing and/or smearing conductive materials across the head. According to various embodiments, the lubricant may be, e.g., an organic fatty acid ester, steric acid, etc., a known lubricant which would be apparent to one skilled in the art upon reading the present description, etc.

Moreover, according to various embodiments, other lubricants including, e.g., polyols, fluorine based lubricants, disk drive lubricants of a type known in the art, etc., may be compatible with and/or used as a lubricant with product 800. However, it is preferred that lubricants used in embodiments described herein (e.g., with product 800) do not form Lewis acids. When such lubricants react with alumina oxide and create Lewis acid, undesirable chemical reactions and/or corrosion of the head in a tape drive may occur. Avoiding lubricants which form Lewis acids may also prevent spacing losses in a tape drive system (e.g. see FIG. 1A).

Illustrative methods of producing product 800 will now be described below.

Figure 9:
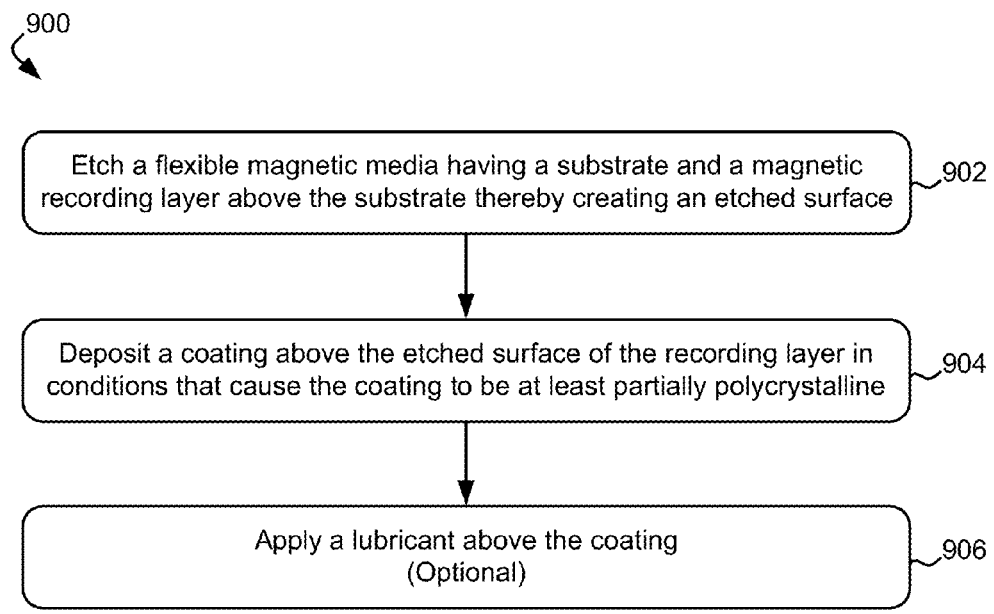
FIG. 9 is a method flowchart, in accordance with one embodiment.

FIG. 9 illustrates a flowchart of a method 900 in according to one embodiment. The method 900 may be performed in accordance with the present invention in any of the environments depicted in FIGS. 1B and 8, among others, in various embodiments. More or less operations than those specifically described in FIG. 9 may be included in method 900, as would be understood by one of skill in the art upon reading the present descriptions.

Operation 902 of method 900 includes a preparatory process, which may include etching a flexible magnetic media having a substrate and a magnetic recording layer above the substrate, thereby creating an etched surface.

The etching may be performed at an angle of between 15 and 75 degrees relative to normal to a surface of the flexible magnetic media being etched (e.g. see angle β of system 1000), with an etching angle between 45 and 75 degrees being preferred. Etching at an angle of between 15 and 75 degrees relative to normal to the surface of the flexible magnetic media being etched has been found by the inventors to promote crystalline alumina growth on the flexible magnetic media, even at room temperature (in a range of 20-30 degrees centigrade).

According to various embodiments, the etching of operation 902 may include bombarding the flexible magnetic media with a material known in the art. For example, the etching of operation 902 may include ion bombarding the flexible magnetic media with ionized argon, e.g., sputter etching, etc.

An etch time on each portion of the flexible magnetic media may preferably be at least 10 seconds. However, the etch time on each portion of the flexible magnetic media may vary depending on the preferred embodiment, e.g., to ensure that a degree of etching that promotes the formation of crystalline growth on the flexible magnetic media has occurred.

Moreover, operation 904 of method 900 includes depositing a coating above the etched surface of the recording layer in conditions that cause the coating to be at least partially polycrystalline. For example, operation 904 may include a sputtering process, as will be described in greater detail below in FIG. 10.

By sputtering the coating, the coating is formed without wear-creating particle-containing defects. Thus, the media may run on TMR heads without having a concern of surface defects damaging the tunnel barrier layer.

Moreover, the coating advantageously protects the media from corrosion and/or adverse interaction with the head. In some approaches, using aluminum oxide as a coating may be preferred due to its compatibility with conventional tape heads.

Referring still to FIG. 9, method 900 may further include adding oxygen to a chamber in which the deposition of operation 904 occurs. For example, according to various embodiments, oxygen may be bled into, ionized in, added into, etc., a vacuum system where the coating operation 904 is performed (see coating chamber 1006 of system 1000) using any process known in the art.

For example, aluminum may be sputtered in an oxygen enriched environment (e.g. see etch clean chamber 1008 of system 1000) to desirably establish a media coating material with a higher crystalline alumina content, e.g., a crystalline content at least higher than achieved by sputtering aluminum in a non-oxygen enriched. Accordingly, as previously mentioned, the coating may include polycrystalline aluminum oxide.

In another approach, an aluminum oxide target may be used during the sputtering.

Method 900 may further include applying a lubricant above the coating, e.g., see optional operation 906. For example, according to various embodiments, the lubricant may be applied above the coating once operation 904 has occurred and/or once the flexible magnetic media has exited the vacuum system where the coating operation 904 is performed (e.g. see vacuum system 1004 of system 1000).

The operations of method 900 may be performed in a system, e.g., such as system 1000, which will now be described below, or any other suitable system.

Figure 10:
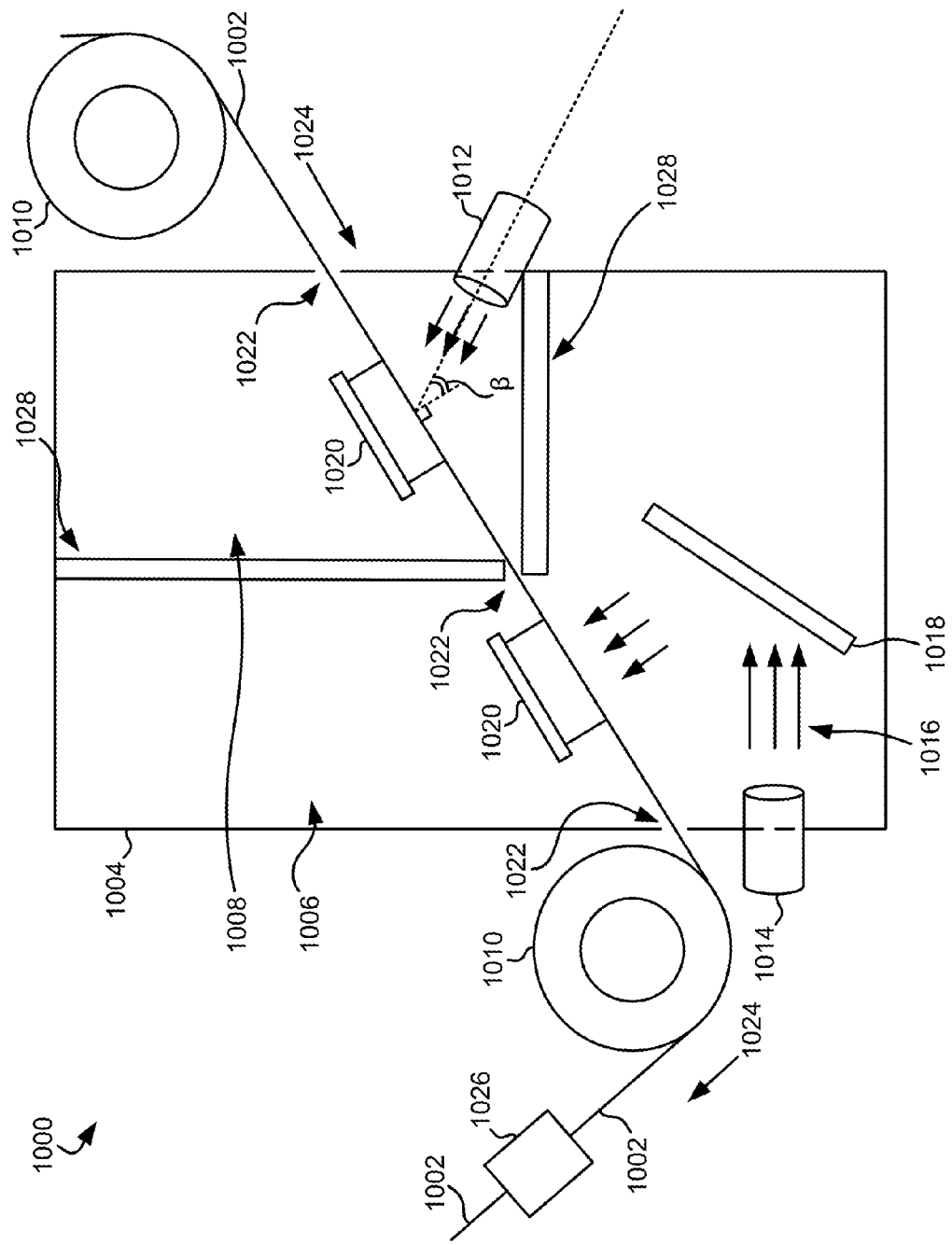
FIG. 10 is a representational diagram of a system, in accordance with one embodiment.

FIG. 10 depicts a system 1000 in accordance with one embodiment. As an option, the present system 1000 may be implemented in conjunction with features from any other embodiment listed herein, such as those described with reference to the other FIGS. Of course, however, such system 1000 and others presented herein may be used in various applications and/or in permutations which may or may not be specifically described in the illustrative embodiments listed herein. Further, the system 1000 presented herein may be used in any desired environment.

System 1000 may be used to perform method 900 to establish a durable coating on a flexible magnetic media 1002. The flexible magnetic media 1002 may be a flexible magnetic media having a substrate and a magnetic recording layer above the substrate. According to various embodiments, the flexible magnetic media 1002 may have a thickness of at least 2 nm.

System 1000 includes drums 1010, e.g., where the flexible magnetic media 1002 is guided by the drums through a vacuum system 1004. The vacuum system 1004 may include an etch clean chamber 1008 and a coating chamber 1006, separated from one another in the vacuum system 1004 by chamber dividers 1028.

The flexible magnetic media 1002 may be passed through the vacuum system 1004, e.g., passing through narrow slits 1022 in the chamber dividers 1028 and the vacuum system 1004, in an intended direction of media travel 1024. According to various embodiments, the flexible magnetic media 1002 passes through the etch clean chamber 1008 and then the coating chamber 1006 in the intended direction of media travel 1024.

In the etch clean chamber 1008, a preparatory process may be performed to prepare the upper surface of the magnetic layer of the flexible magnetic media 1002 for formation of the coating thereon. the flexible magnetic media 1002 may be etched to thereby create an etched surface on the flexible magnetic media 1002. As previously described, the etching of the flexible magnetic media 1002 may include e.g., sputter cleaning, bombarding with ionized argon, etc. For example, as shown in system 1000, an etching source 1012 may etch the flexible magnetic media 1002 passing thereby at an angle β of between 15 and 75 degrees relative to normal to a surface of the flexible magnetic media 1002 being etched. According to a preferred embodiment, angle β may be about 60 degrees relative to normal to a surface of the flexible magnetic media 1002 being etched. Where sputter cleaning is used, the sputtering energy during the etching may be in a range of about 250 to about 500 eV. Where the etch source is an argon beam, the etch voltage source is at least 200 V.

A media surface opposite the flexible magnetic media surface being etched may contact a cooling device 1020, e.g., to cool the portion of the flexible magnetic media 1002 being etched and thereby prevent the portion of the flexible magnetic media 1002 being etched from overheating such as above a glass transition temperature of the media.

The etch time on each portion of the flexible magnetic media 1002 may vary depending on the embodiment. According to preferred embodiments, the etch time on each portion of the flexible magnetic media 1002 is at least about 10 seconds.

The cleaning may result in formation of a graded transition layer, e.g., in region 808 of FIG. 8, between the first magnetic layer and the subsequently-formed crystalline alumina layer thereabove. The composition of the graded $CoFeAlO_x$ transition layer thus transitions from a higher CoFe content at the left side to a higher alumina content on the right side.

The flexible magnetic media 1002 may pass between narrow slits 1022 in the chamber dividers 1028 into the coating chamber 1006. In the coating chamber 1006 a coating may be deposited above the etched surface of the recording layer, preferably in conditions that cause the coating to be at least partially polycrystalline.

According to various embodiments, the process of depositing the coating may include sputtering an alumina target 1018 with a beam 1016 of ions, e.g., argon and/or some other species, using a device 1014. In one approach, the target may be a substantially stoichiometric alumina target, e.g., $Al_2O_3$.

According to another example, which is in no way intended to limit the invention, an alumina target may be used. In a further approach, the target may be primarily or entirely elemental aluminum. During the deposition process, oxygen may be added to the coating chamber 1006, so that aluminum oxide forms and is deposited on a portion of the flexible magnetic media 1002. The amount of oxygen added to the coating chamber 1006 may be selected to provide an amount that would promote crystalline formation in the resulting alumina film.

In further approaches, the coating may be deposited using a known technique other than sputtering, such as by chemical vapor deposition.

The portion of the flexible magnetic media 1002 where the coating is actively being deposited may contact a cooling device 1020, e.g., to cool the portion of the flexible magnetic media 1002 being coated. Cooling device 1020 may thereby prevent the portion of the flexible magnetic media 1002 being coated from overheating, cool the coating material to form a crystalline alumina oxide coating, etc. The cooling device 1020 in the coating chamber 1006 may be similar to the cooling device 1020 in the etch clean chamber 1008.

With continued reference to FIG. 10, a lubricant may be added to the flexible magnetic media 1002 by a lubricant applicator 1026, e.g., to an exterior of the coating. According to some embodiments, the lubricant may be added to the flexible magnetic media 1002 by a lubricant applicator 1026 after the flexible magnetic media 1002 has exited the vacuum system 1004. Thus, the lubricant may be added after the etching and coating operations 902, 904 of method 900 have been performed on the flexible magnetic media 1002. In some approaches, the lubricant applicator 1026 may even be positioned in the vacuum system 1004, e.g., a lubricant may be added onto an outmost portion of the coating applied to the flexible magnetic media 1002 while in the coating chamber 1006. The lubricant application process may be a process of a type known in the art.

Figure 11:
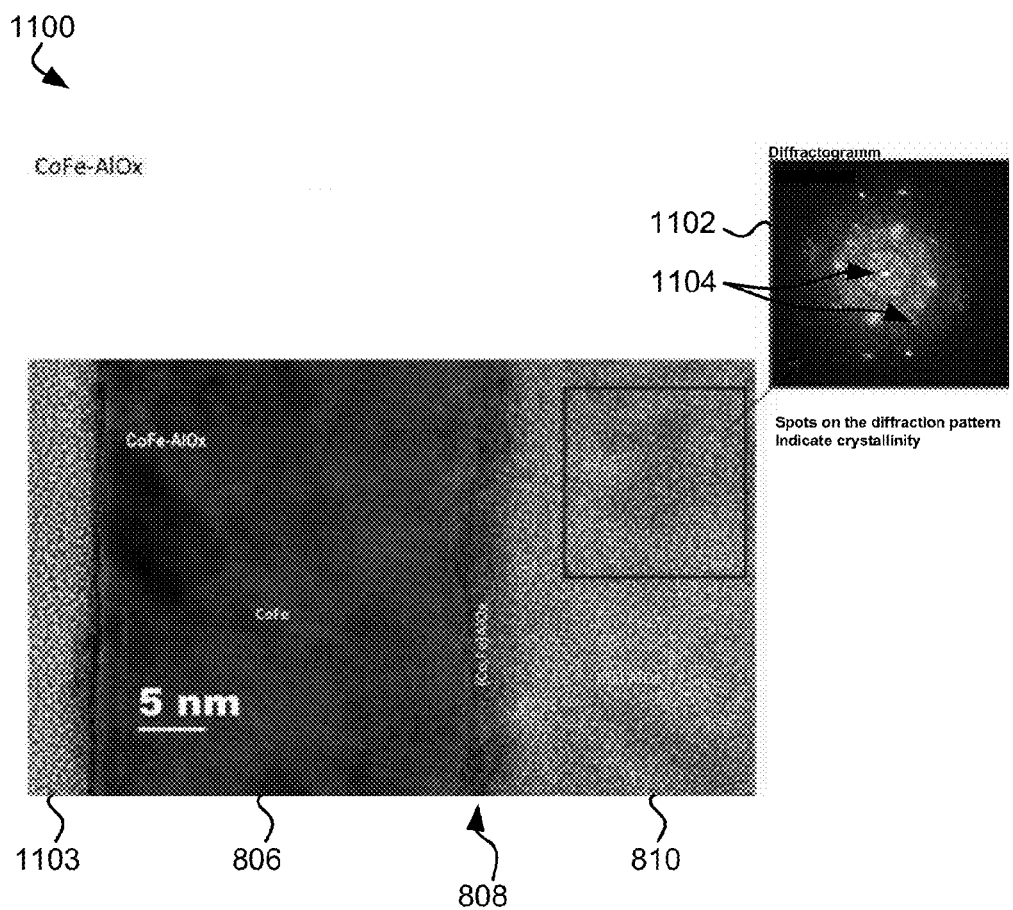
FIG. 11 is a generated schematic view of a magnetic coating, in accordance with one embodiment.

Referring now to FIG. 11, there is shown a transmission electron microscopy (TEM) image 1100 of a coupon having a CoFe film having a partially polycrystalline coating of alumina thereon created using the process described above, e.g., see method 900.

The coupon includes a substrate 1103, a magnetic recording layer 806 of CoFe, and an alumina coating 810 thereon. A graded transition layer is formed between the first magnetic layer and the subsequently-formed crystalline alumina layer thereabove.

An enhanced portion 1102 of the coating 810 is illustrated in the top right corner of FIG. 11 to show a diffraction pattern of the alumina in the coating 810 which indicates crystallinity. Specifically, crystallinity may be noted in the present embodiment by the presence of spots 1104.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A product, comprising:
    a flexible magnetic media having a substrate, a magnetic recording layer having cobalt therein, and an at least partially polycrystalline coating above the magnetic recording layer,
    wherein the at least partially polycrystalline coating includes aluminum oxide and wherein a density of the at least partially polycrystalline coating due to crystallinity is at least 30% greater than that of a purely amorphous material of the same chemical composition and approximate thickness.

2. The product as recited in claim 1, wherein the at least partially polycrystalline coating consists essentially of aluminum oxide.

3. The product as recited in claim 1, wherein the magnetic recording layer further includes at least one material selected from the group consisting of: platinum, chromium, nickel, and aluminum.

4. The product as recited in claim 1, wherein the magnetic recording layer is greater than 10 atomic % cobalt.

5. The product as recited in claim 1, wherein the magnetic recording layer further includes iron.

6. The product as recited in claim 1, comprising an underlayer between the substrate and the magnetic recording layer.

7. The product as recited in claim 1, wherein the at least partially polycrystalline coating includes multiple layers, wherein one of the layers is a layer of ruthenium oxide.

8. The product as recited in claim 1, wherein the coating is at least three nanometers thick.

9. The product as recited in claim 1, comprising a lubricant on the flexible magnetic media, wherein the lubricant is an organic fatty acid ester.

10. The product as recited in claim 1, wherein the flexible magnetic media is a magnetic tape.

11. The product as recited in claim 1, wherein the magnetic recording layer comprises magnetic particulates in a binder.

12. The product as recited in claim 1, wherein the coating includes multiple solid layers of aluminum oxide.

13. A product, comprising:
    a flexible magnetic media having a substrate, a magnetic recording layer having cobalt therein, and an at least partially polycrystalline coating above the magnetic recording layer,
    wherein the at least partially polycrystalline coating includes ruthenium oxide.

14. The product as recited in claim 13, wherein the at least partially polycrystalline coating consists essentially of ruthenium oxide.

15. The product as recited in claim 13, comprising a lubricant on the flexible magnetic media, wherein the lubricant is an organic fatty acid ester.

16. A product, comprising:
    a flexible magnetic media having a substrate, a magnetic recording layer having cobalt therein, and a nonmagnetic coating above the magnetic recording layer,
    wherein the coating comprises an at least partially polycrystalline layer formed of a material comprising aluminum oxide, ruthenium oxide, or both aluminum oxide and ruthenium oxide wherein a density of the coating due to crystallinity is at least 30% greater than that of a purely amorphous material of the same chemical composition and approximate thickness.

17. The product as recited in claim 16, wherein the magnetic recording layer comprises magnetic particulates in a binder.

18. The product as recited in claim 16, wherein the coating includes multiple solid layers.

19. The product as recited in claim 16, wherein the at least partially polycrystalline layer is a dielectric, and comprising a lubricant on the flexible magnetic media, wherein the lubricant is an organic fatty acid ester, wherein the magnetic recording layer comprises magnetic particulates in a binder.

20. The product as recited in claim 16, wherein the at least partially polycrystalline layer consists essentially of aluminum oxide.

* * * * *